United States Patent
Fecteau et al.

(10) Patent No.: US 12,022,978 B2
(45) Date of Patent: Jul. 2, 2024

(54) FILTER PAN DETECTION AND FLUID SENSOR SYSTEM

(71) Applicant: PITCO FRIALATOR, INC., Bow, NH (US)

(72) Inventors: Michael T. Fecteau, Derry, NH (US); Steven J. Cyr, Londonderry, NH (US); Karl M. Searl, Newmarket, NH (US)

(73) Assignee: PITCO FRIALATOR, INC., Bow, NH (US)

( * ) Notice: Subject to any disclaimer, the term of this patent is extended or adjusted under 35 U.S.C. 154(b) by 922 days.

(21) Appl. No.: 16/980,941

(22) PCT Filed: Mar. 15, 2019

(86) PCT No.: PCT/US2019/022394
§ 371 (c)(1),
(2) Date: Sep. 15, 2020

(87) PCT Pub. No.: WO2019/178435
PCT Pub. Date: Sep. 19, 2019

(65) Prior Publication Data
US 2021/0251426 A1    Aug. 19, 2021

Related U.S. Application Data

(60) Provisional application No. 62/643,979, filed on Mar. 16, 2018.

(51) Int. Cl.
*A47J 37/12*    (2006.01)
*B01D 29/60*    (2006.01)
(Continued)

(52) U.S. Cl.
CPC ....... *A47J 37/1266* (2013.01); *A47J 37/1223* (2013.01); *A47J 37/1285* (2013.01);
(Continued)

(58) Field of Classification Search
CPC .......................... B01D 29/605; B01D 35/143; B01D 35/1537; B01D 2201/16; G01F 23/0007;
(Continued)

(56) References Cited

U.S. PATENT DOCUMENTS

| | | |
|---|---|---|
| 5,617,777 A | 4/1997 | Davis et al. |
| 5,776,530 A | 7/1998 | Davis et al. |

(Continued)

FOREIGN PATENT DOCUMENTS

| | | |
|---|---|---|
| CN | 107307024 A | 11/2017 |
| EP | 0095063 A2 | 11/1983 |
| GB | 2314631 A | 1/1998 |

*Primary Examiner* — Hung D Nguyen
(74) *Attorney, Agent, or Firm* — Seyfarth Shaw LLP; Brian Michaelis (57) ABSTRACT

A capacitive sensor and control system is configured to detect the presence (or absence) of a filter pan and of fluid within a filter pan. Configured in a filter pan of a deep fryer, the sensor determines when a level of liquid within the filter pan is at or above the level of the. The sensor is in communication with the control system and the sensor sends a signal to the control system representative of the presence of liquid within the filter pan and at the level of the sensor. The controller receives the signal from the sensor, and allows operation of a fluid management system and its associated plumbing to completely and safely move oil into and out of the filter pan.

9 Claims, 9 Drawing Sheets

(51) Int. Cl.
  *B01D 35/143* (2006.01)
  *B01D 35/157* (2006.01)
  *G01V 3/08* (2006.01)

(52) U.S. Cl.
  CPC ......... *B01D 29/605* (2013.01); *B01D 35/143* (2013.01); *B01D 35/1573* (2013.01); *G01V 3/08* (2013.01); *B01D 2201/16* (2013.01)

(58) Field of Classification Search
  CPC ...... G01F 23/265; G01V 3/08; A47J 37/1223; A47J 37/1247; A47J 37/1261; A47J 37/1266; A47J 37/1271; A47J 37/1285
  See application file for complete search history.

(56) References Cited

U.S. PATENT DOCUMENTS

| | | | |
|---|---|---|---|
| 5,973,502 A | 10/1999 | Bailleul et al. | |
| 8,689,679 B2* | 4/2014 | Tiszai | A47J 37/1266 99/330 |
| 2007/0040559 A1 | 2/2007 | Klun | |
| 2009/0309619 A1* | 12/2009 | Behle | A47J 37/1223 99/403 |
| 2011/0043224 A1* | 2/2011 | Yu | G01N 33/03 324/658 |
| 2013/0036916 A1* | 2/2013 | Burkett | G01N 33/03 99/330 |
| 2017/0095117 A1* | 4/2017 | Savage | B30B 9/047 |
| 2017/0176369 A1 | 6/2017 | Lambert et al. | |

* cited by examiner

FILTER PAN DETECTION AND FLUID SENSOR SYSTEM

The present application is a National Stage application of International Application No. PCT/US2019/022394, filed Mar. 15, 2019, which claims priority to U.S. Provisional Patent Application No. 62/643,979, filed Mar. 16, 2018, both of which are incorporated by reference herein in their entireties.

TECHNICAL FIELD

This specification relates to fluid sensors and detection systems, and more specifically to a sensor implemented in a controlled cooking system.

BACKGROUND

In some known controlled cooking systems, such as deep frying cooking systems, control systems and associated sensor(s) may be used to detect the presence or level of fluids in the system to ensure these systems operate at desired times.

Further, in some cooking systems, removable filter pans are used to filter and remove debris and/or other impurities from the fluid. These removable filter pans, however require multiple sensors for different purposes. For example, one sensor is used to detect and ensure the removable filter pan is positioned correctly within in the deep fryer. Additional fluid sensors are also needed to detect the presence of fluid in these filter pans.

Known systems include multiple sensors, each with its own purpose. For example, level sensors directly sense the level of fluid based on position of a float on a shaft. In a cooking system context, the environment in which the sensor is used may not be conducive to smooth, continuous operation. For example, in a deep fryer context, debris may be present in the fluid in the system and create impediments to the float riding freely along the shaft. The float may become stuck at a level that does not indicate the actual level of fluid. Sticking floats can create problems in such systems, such as providing for operation of system components when insufficient fluid is in the system.

Capillary sensors are also known for fluid level sensing. Capillary sensors receive fluid into a capillary tube and determine level as a function of the location of the fluid within the tube. In cooking environments, such as a deep fryer context to determine level of fluid in a filter pan, capillary sensors may be problematic due to differences in viscosity of the fluid that may need to be sensed. For example, some cooking fluids at certain temperatures will be in a partially solid phase so that capillary action within a capillary tube is not effective and level cannot be sensed (e.g. if the fluid is a solid at low temperatures such as is the case with lard). Also, capillary sensors may retain fluid in the capillary creating unsanitary conditions in use in a food-related context, because spaces within the capillary that retain fluid cannot easily be cleaned. Still further, debris, air pockets or bubbles that may be retained within the capillary will be subject to temperature changes (sometimes extreme) that can cause sensor failure.

Position sensors may be used to detect and determine if a filter pan is in place and correctly aligned. Such sensors, typically located at or near the edge of a removable filter pan can be problematic as they can be snagged, broken or otherwise damaged during movement of the filter pan. Additionally, contact sensor pads that are engaged or activated when the filter pan is in place can become dirty, damaged or otherwise incapacitated and are difficult to clean, repair or replace when located in hard-to-access areas.

SUMMARY OF THE DISCLOSURE

The present disclosure provides a sensor and control system that is convenient, reliable and provides a dual-purpose sensor in controlled cooking systems, and in particular in the removable filter pan apparatuses, that detects both the presence and appropriate placement of the filter pan and an appropriate fluid level in the pan itself.

The disclosed sensor and control system, implemented in a controlled cooking system, provides a dual-purpose and operates to sense a wide range of viscosities of fluid, from partially solid to low viscosity. According to one embodiment, a highly reliable and sanitary sensor is implemented as a capacitive sensor that determines capacitance of the fluid surrounding the sensor. The sensor may be disposed in a removable filter pan for a deep fryer, wherein the fluid in the filter pan may be a fluid for cooking (e.g. cooking oil, lard, and the like). The sensor may be configured and disposed to sense the capacitance of fluid in which the sensor is disposed, e.g. between the sensor and a wall of the filter pan, and thereby determine the relative capacitance of the fluid (and presence or absence of same) surrounding the sensor in the filter pan. The sensor may serve a dual-purpose as a filter-pan detection sensor ensuring proper installation and placement of the removable filter pan prior to operation, and fluid level sensor determining presence or absence of fluid in the filter pan.

A filter pan detection and fluid sensor system according to the disclosure comprises a capacitive sensor in communication with sensor electronics. The sensor electronics interface with a microcontroller or processor that is in communication with a fluid management system for control of a fluid provisioning subsystem and its associated plumbing. In the illustrative filter pan context, the microcontroller is in communication with a control system and a fluid management system. The control system may control the operation and functionality of the cooking system according to a filter pan detection sensor signal. The fluid management system may control plumbing equipment (e.g., valves, pumps and piping) for the addition and removal of fluid from the cooking system, and in particular addition and removal of fluid from the filter pan.

In operation, in the illustrative embodiment, the capacitance of cooking oil (e.g. heated or around room temperature) may be significantly different than the capacitance of air. The microcontroller, which receives a signal from the sensor electronics that is representative of the measured capacitance from the sensor, can determine the presence of fluid proximate to the sensor and thereby activate the fluid management system to move fluid to or remove fluid from the filter pan In some embodiments, the sensor may be calibrated such that the sensed capacitance (and therefore the existence and level of fluid proximate to the sensor) is specifically based upon the position of the sensor with respect to the walls and/or structures of the filter pan.

In an illustrative embodiment of a deep fryer, the fryer may have a filtration system for receipt and filtering of a volume of oil. The capacitive sensor may be positioned within the filter pan of the filtration system such that the sensor is in contact with the volume of oil disposed within the filter pan. The sensor may be configured to detect the presence of oil within the pan when the level of oil is at or above the level of the sensor. In addition, the sensor signal may indicate that the filter pan is properly installed for use with the deep fryer. Thus the detection of a capacitance signal by the controller may be used as an affirmation of the correct installation and positioning of the filter pan. The capacitive sensor may be in communication with a controller and send a signal, via sensor electronics, to the controller representative of the presence or absence of oil within the filter pan at the level of the sensor.

The controller may interface to a fluid management system. The fluid management system, in turn, may control operation of one or more components responsible for moving fluid through the filtration system. The condition sensed and reported by the sensor may dictate the operation of pumps and valves to provide fluid to or remove it from the filter pan.

Advantages of the present disclosure will become more apparent to those skilled in the art from the following description of detailed embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION

Figure 1:
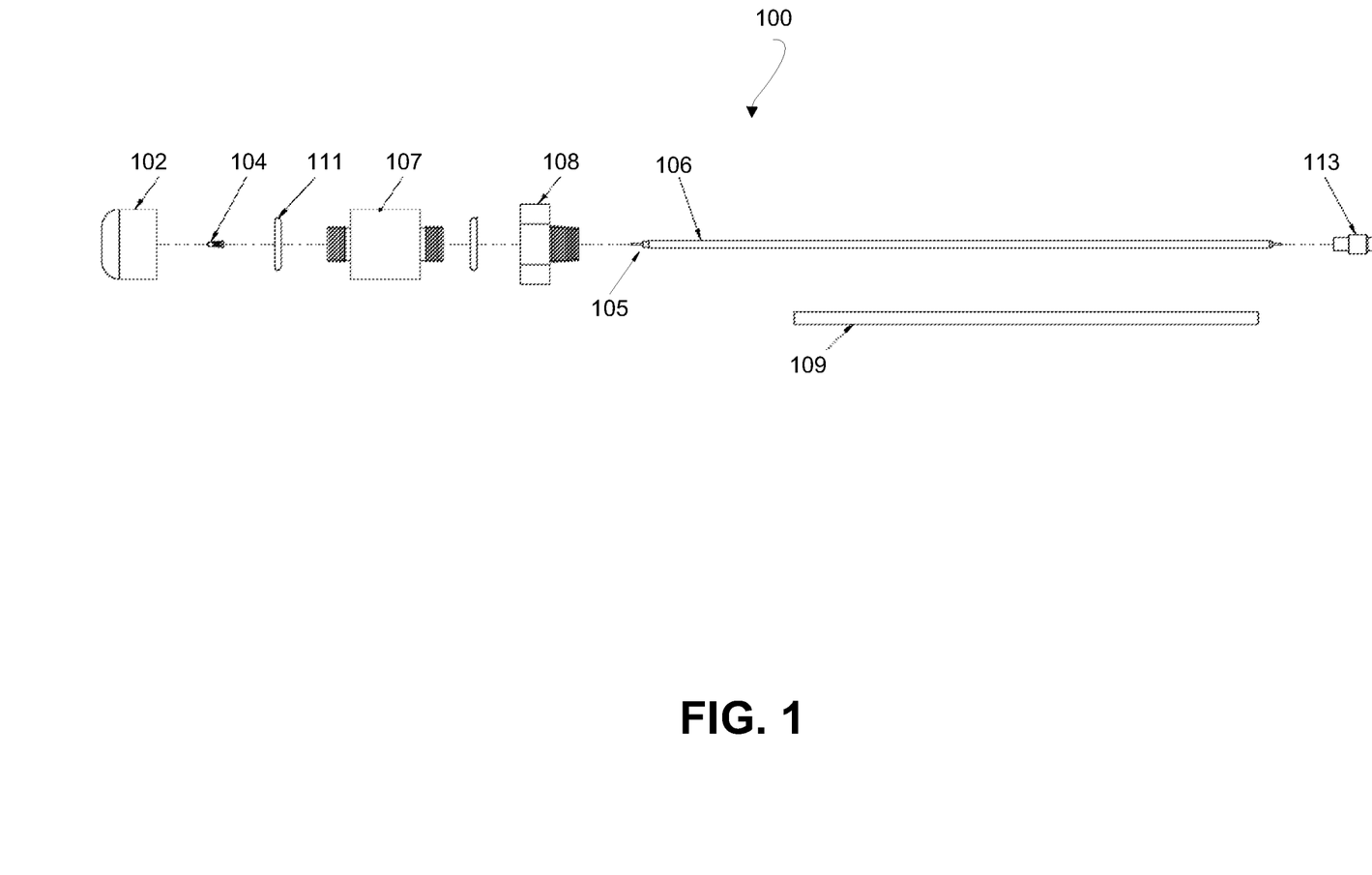
FIG. 1 is an exploded view of a capacitive sensor according to the disclosure.
Figure 2A:
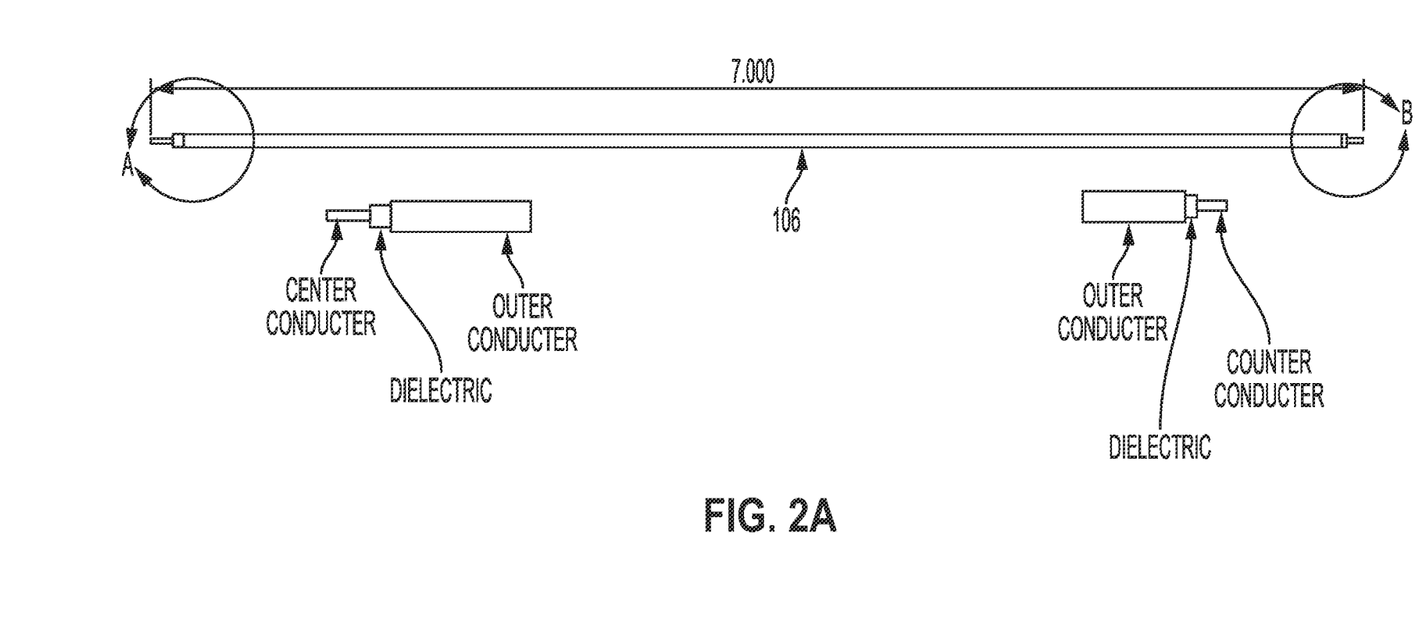
FIGS. 2A-2E are detailed views of components and assemblies of the capacitive sensor of FIG. 1.
Figure 2B:
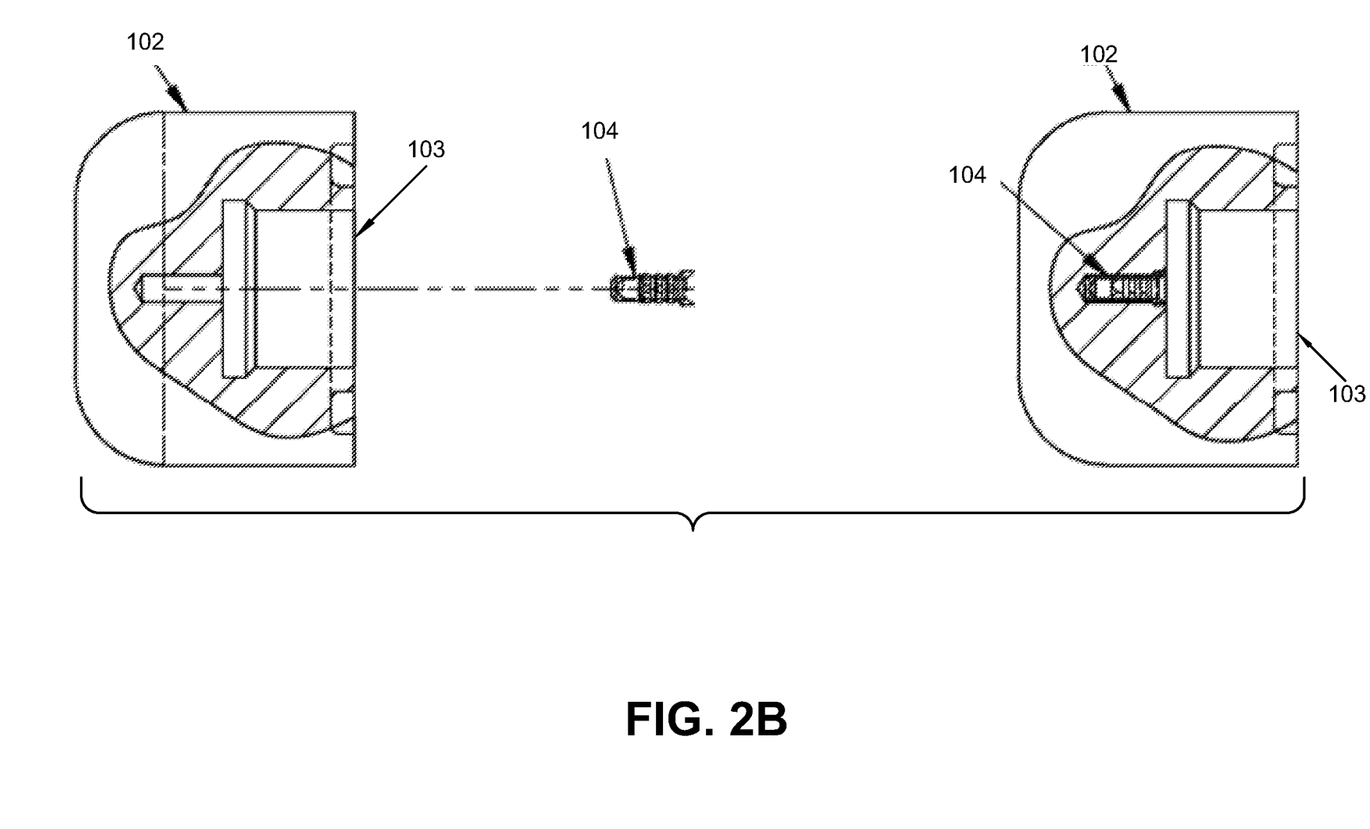
Figure 2C:
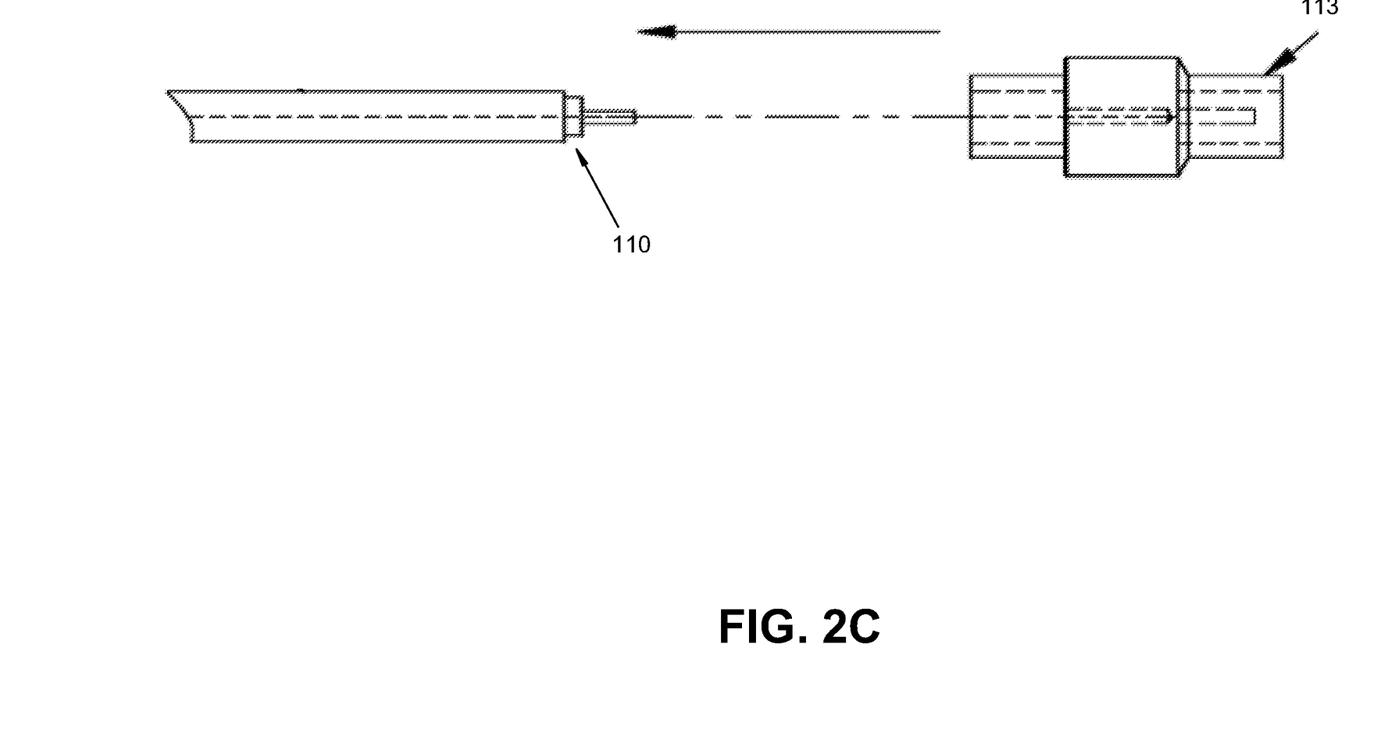
Figure 2D:
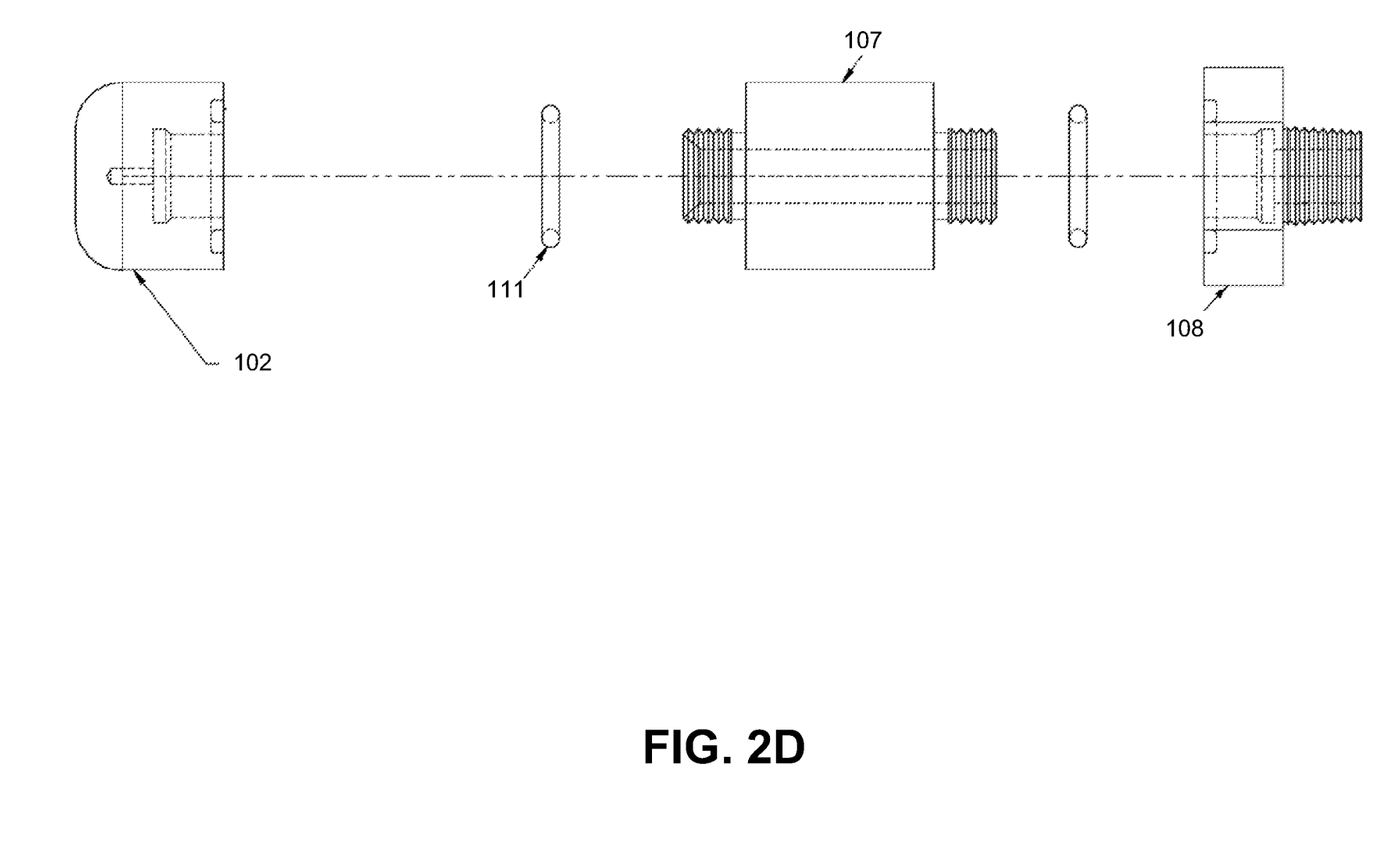
Figure 2E:
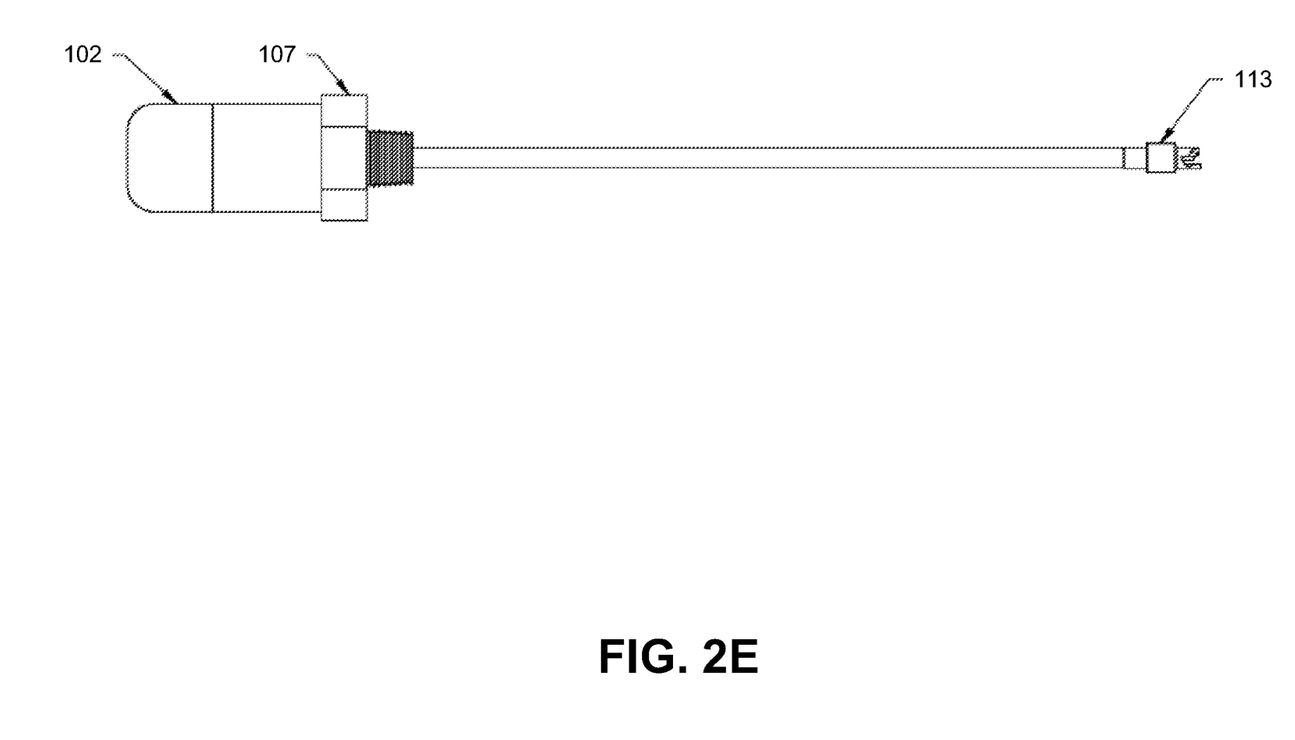

A capacitive sensor probe constructed for installation in a fluid environment, such as a filter pan context according to the disclosure, is illustrated in FIG. 1. The sensor probe 100 is configured and constructed to operate across a wide range of viscosities of fluid, from partially solid to low viscosity, at a wide range of temperatures, and is generally constructed of materials that are "food safe" as the materials may be used in a cooking environment in contact with foodstuffs. In operation, as described in more detail hereinafter, the capacitive sensor probe acts as a "plate" of a capacitor, in conjunction with a metallic portion of the environment in which the probe 100 is housed (e.g. a portion of a metallic fryer vat) with the fluid disposed in the environment acting as a dielectric of the capacitor.

The sensor 100 is implemented as a capacitive sensor that senses the capacitance of the fluid surrounding the sensor. In an illustrative embodiment the sensor according to the disclosure is disposed on or through the wall of a filter pan, e.g. in a deep fryer, wherein fluid in the filter pan may be fluid for cooking (e.g. cooking oil, lard or the like). The sensor 100 is configured and disposed to sense the capacitance between the sensor and wall of the filter pan and thereby determine the relative capacitance of the fluid in the filter pan, from which it can be determined whether fluid is above or below a specific level to provide pertinent information to a control system for subsequent decision making. Alternatively, the sensor may be disposed horizontally or vertically in the filter pan, or may be disposed horizontally or vertically within an open cavity formed in a side wall of the filter pan.

A capacitive sensor probe according to the disclosure is best illustrated in FIGS. 1 and 2A-2E. The sensor may include a metal geometrically-shaped, e.g. cylindrical, shell or probe radiator 102 that is disposed at an extreme end (e.g. the top) of the sensor assembly. The shell/radiator 102 may include a recess 103 (best seen in FIG. 2B) that receives a receptacle 104 press fit into the shell 102 for electrically conductive engagement with the shell 102. The receptacle 104 is configured to receive a stripped cable end 105 (Detail A of FIG. 2A) of a coaxial cable having a center conductor, dielectric around the center conductor, and outer conductor, forming a coaxial electrode 106. The center conductor is in electrical continuity with the radiator 102. The radiator 102 abuts an insulator 107 that is configured to fit adjacent the radiator. In this illustrative embodiment, the insulator 107 has threads that are configured to thread into the recess 103 of the radiator 102. An O-ring 111 may be disposed between the radiator 102 and insulator 107. The insulator 107 may be made from PTFE, PEEK or other materials that insulate against electrical transmission and/or heat transmission and are also capable of withstanding temperatures such as up to about 500 degrees Fahrenheit. A sensor mount 108 is disposed adjacent to and abuts the insulator 107 and may have an O-ring disposed there between. The insulator 107 and sensor mount 108 are hollow so that the coaxial electrode 106 can extend through those bodies. The coaxial electrode 106 may be encased in PTFE heat shrink tube 109. A stripped cable end 110 of the coaxial electrode 106, distal from the radiator 102 is connected to a connector jack 113, with the outer conductor of the coaxial cable in electrical continuity with a shell portion of the connector jack 113. In some embodiments of the capacitive sensor, a fitting (not shown) may be provided below the radiator 102 or below the insulator 107, to configure the sensor to be attached to and removed from the system for inspection, cleaning, replacement or the like.

Figure 3:
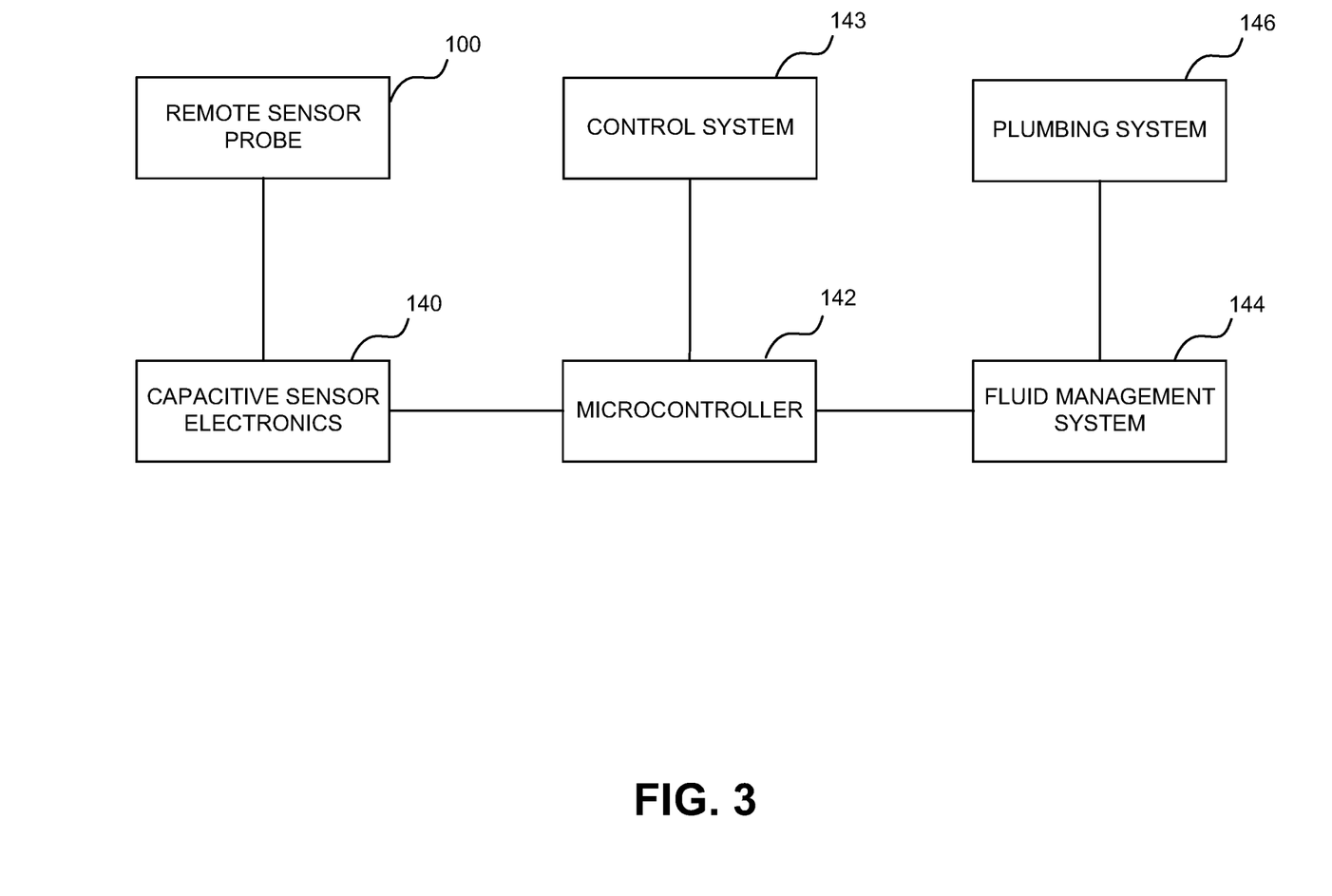
FIG. 3 is a functional block diagram of a control system utilizing the capacitive sensor of FIG. 1.

As illustrated in FIG. 3, in the system according to the disclosure the capacitive sensor probe 100 is in electrical/electronic communication with capacitive sensor electronics 140. In an illustrative embodiment the sensor electronics 140 includes a Texas Instruments FDC1004 4-channel capacitance-to-digital converter integrated circuit (IC), or substantial equivalent. A capacitive channel of the IC is electrically connected to the inner conductor of the coaxial electrode 106 which is in turn connected to the radiator 102 of the sensor probe 100. The IC and metallic portion(s) of the tank are grounded to a common ground. The outer conductor of the coaxial electrode 106 is electrically connected with the IC as an active or sensing shield to reduce electromagnetic interference and parasitic capacitance from sources other than the sensor probe 100. The sensor electronics 140 converts the analog capacitive signal generated by the sensor electronics into a digital signal for communication, via a I$^2$C serial bus, to a microcontroller or processor 142.

Referring still to FIG. 3, the microcontroller 142, for example a STM32 family microcontroller available from STMicroelectronics, Geneva, Switzerland, receives the digital signal from the sensor electronics 140. The digital signal is representative of a level of capacitance created by the fluid surrounding the sensor probe, and is communicated to the microcontroller 142 as a capacitive value. The microcontroller 142 may be in communication with a control system 143, or may be programmed with control software that provides functionality as described herein, that engages or prevents certain functionalities of the cooking system. If the sensor probe is not in communication with the sensor electronics, or the sensor electronics are not in communication with the microcontroller, it is indicated that no filter pan is in place, or the filter pan is improperly installed. In such a case, the microcontroller may instruct the control system to create an alarm or other notification, or may shut-down the system (or portions thereof) to prevent unsafe operation.

The microcontroller 142 may be in communication with a fluid management system 144, which controls (i.e., operates) the components of a plumbing system 146 in communication with the fluid management system. The plumbing system, as described in greater detail below, may include piping, valves and pumps that allow the flow of fluid, such as cooking oil, to and from the filter pan.

Figure 4:
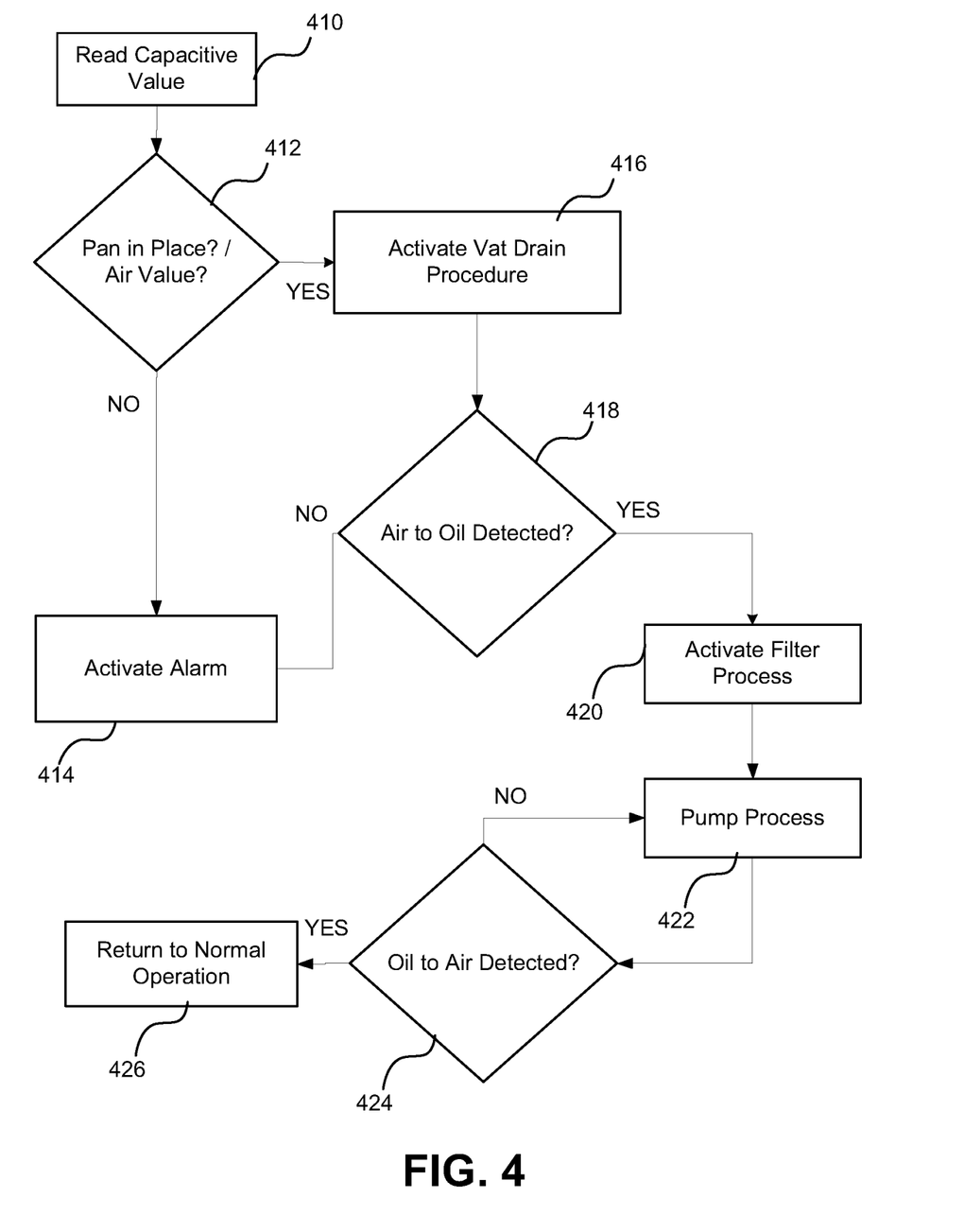
FIG. 4 is a flow diagram of operation of the capacitive sensor of FIG. 1 controlled by the control system of FIG. 3, according to one aspect of the disclosure.

Referring now to FIG. 4, an exemplary filter process implemented and controlled by the microcontroller 142 is illustrated. A filter operation may be initiated by either an operator or automatically at the cooking controller including microcontroller 142. In order to begin the process, the filter pan must be in-place and empty. The microcontroller 142 reads the digital capacitive value 410 from the sensor electronics 140. Additionally, in an implementation with a removable filter pan, the receipt of a capacitive value from the sensor may indicate that the removable filter pan is in place and installed correctly. The illustrative control processing, implemented by microcontroller program code, then determines 412 if the capacitive value read from the sensor indicates that the filter pan represents an air value. An air value may be indicated if the capacitive reading is within a minimum and maximum acceptable range of the sensor probe and sensor electronics 140 for air (i.e., the fluid between the sensor and a side wall is air). An illustrative acceptable range for a capacitance determination in a filter pan application may be, for example, approximately 2 picofarad (pF) (minimum) to 3 pF (maximum). If the capacitive value is not read (i.e., the filter pan is not in place or installed correctly) or is out of the acceptable range (i.e., the filter pan is not empty) the microcontroller may activate an alarm 414 indicating the missing or out of range signal. If the capacitive value is within the min/max range for an air value, then the controller may determine that the filter pan is empty and ready to begin a filter operation.

To begin the filter operation, the microcontroller 142 may activate a drain procedure 416 in which the oil is transferred from the fryer vat or frypot to the filter-pan apparatus for filtering. The microcontroller may then monitor the capacitive readings from the sensor to detect an air-to-oil condition 418 in the filter pan. An air-to-oil condition may occur when the capacitance measured by the sensor changes from an air value to an oil value. An illustrative acceptable range for a capacitance determination for oil in a filter pan application may be, for example 0 picofarad (pF) (minimum) to 16 pF (maximum). If, after a monitored period of time, no air-to-oil condition is detected, the microcontroller may activate an alarm 414 or otherwise indicate a filter system fault.

If an air-to-oil condition is detected, indicating the oil has been drained from the fryer vat to the filter pan (i.e. indicating there is sufficient oil present in the filter pan), a filter process may begin. During the filter process the oil in the filter pan is transferred through a porous material or other filtering mechanism to remove debris and undesirable particles from the oil. The filtering operation may be a continuous cycling of the oil through the filtering mechanism for a duration of time. If a valid capacitive value is lost or undetected at any point during the process, via either removal of the pan or presence of an improper fluid such as water, all fluid movement stops where it is and the filter process shuts down. An alarm may be activated indicating such a condition.

After the filtering process is complete, the microcontroller may activate a pump process 422, by which the oil in the filter pan is pumped from the filter pan back to the fryer vat or frypot. The microcontroller 142 monitors to receive data from the capacitive sensor to determine if an oil-to-air condition has been satisfied 424. The oil-to-air condition will indicate that the capacitance read from the sensor is no longer within the range for oil, but rather back in the acceptable range for air, indicating the filter pan is now empty of oil and the fryer vat is ready to return to normal operation 426.

Figure 5:
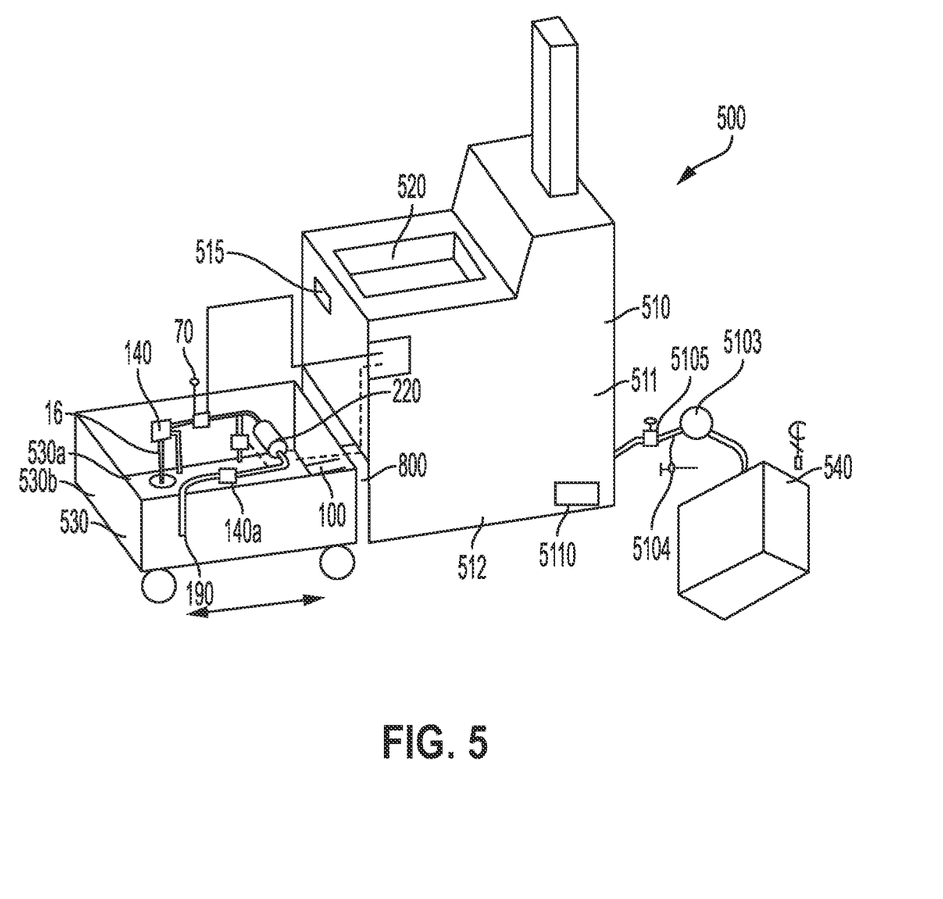
FIG. 5. is a perspective view of an illustrative embodiment of a deep fryer with a dual-purpose capacitive sensor.

Turning now to FIG. 5, a controlled cooking system 500 in the form of a commercial deep fryer 510 is illustrated. An illustrative filter pan detection and fluid sensor system according to the disclosure is readily utilized with the deep fryer 510 where cooking liquid, such as oil, may be filtered through the filtration system 530, due to debris being collected within the fryer 510 from the food product being cooked therein.

The filtration system 530 may be rigidly fixed to the deep fryer 510, such as within the housing in a space 800 below a frypot 520 and equipment used to heat the oil within the frypot 520, such as a gas burner system (not shown). Alternatively, the filtration system 530 may be disposed on sliders or rollers engaging with the housing of the deep fryer. The filter pan 530b may be disposed within or directly below the housing, such as during cooking operations of the deep fryer, and may be slid/actuated out of at least a portion of the housing of the fryer 510 to allow for easy access to the components of deep fryer 510 and the filtration system 530 for repair and maintenance. It should be appreciated that in alternative embodiments the filtration system may be a separate system installed proximate to the fryer when in use.

In the illustrated embodiment, the removable nature of the filter pan 530b may present operational hazards arising from a filter pan that is out of place or incorrectly installed beneath the frypot 520. Operation of the fryer 510 when the filtration system is missing, misaligned or otherwise compromised can lead to spillage, leakage, or loss of dangerously hot cooking oil. To avoid such problems the present disclosure provides a detection capability for the sensor 100. The sensor 100 may be electrically connected through a relay, switch or other electrical device to a control system 5110. The relay may be in the form of electrical contacts disposed on or around the outer edges or walls of the filter pan 530b. When the filter pan is in place and aligned correctly, the relay contacts establish electrical communication between the sensor 100 and the control system 5110. The control system may periodically query the sensor 100 and its electronics such that if an appropriate capacitance signal is received from the sensor, the control system 5110 knows the filter pan 530b and the associated filtration system 530 are in place and operable. If, on the other hand, the control system 5110 receives no signal at all from the capacitive sensor 100, the control system 5110 may signal a missing or mis-aligned filter pan 530b and/or may consequently prevent or stop operation of the fryer 510. For example, the control system 5110 may be configured to issue an alarm to the kitchen operator that indicates the filtration system 530 is not in place or not properly positioned within the deep fryer 510.

According to another aspect of the disclosure, the capacitive sensor 100 may at the same time function as a fluid detection sensor for the filter pan. Embodiments of the detection system as discussed provide for installation of the detection sensor 100 in the filter pan 530*b* of the filtration system 530. The sensor 100 may be configured to detect the proper placement of the filtration system 530 and the proper fluid level (i.e. presence) of oil in the system. The control system 5110, in communication with the sensor 100, may be configured to generate an automatic signal that the filtration system/filter pan is not in place or that fluid is or is not in the filter pan, as explained above.

The filter pan 530*b* for receiving and holding cooking oil may include a receiving space that supports a filter material 530*a*. The filter material 530*a* removes foreign matter, crumbs and/or other impurities from the oil disposed within the vat that pass through the filter material. The filter material 530*a* may be a conventional filter for cooking oil, such as with one or more of a filter screen, a mesh, a paper, or a fabric that is used to mechanically and/or chemically remove particles and impurities from oil (due to oxidation or hydrolysis, for example) within the filter pan 530*b*, and specifically as oil passes through the filtering material 530*a*.

The filter pan 530*b* of the filtration system 530 may receive oil that is drained from the deep fryer 510, and specifically from the vat or frypot 520. In some embodiments, the filter pan 530*b* may be a common collector and receive cooking oil from a plurality of different deep fryers that are used in the same facility, such as a bay of frypots used within a bank of deep fat fryers.

The filtration system 530 may include a pump 220 that is in fluid communication with the filter pan 530*b*, and specifically to pump a volume of oil to/from the filter pan 530*b*. In some embodiments, the pump is connected with the vat to pump fluid/oil from the frypot 520 to the filter pan 530*b*, and further to pump fluid from the system (for example, to drain the fryer of oil) via a hose or pipe 190 (FIG. 5). One or more pumps may be configured to return the fluid, e.g. cooking oil, to the frypot 520 of the deep fryer 510. The discharge of the pump may be fluidly connected to a return hose or pipe 190. As may be appreciated by those skilled in the art, instead of implementing a pump in some contexts, flow of fluid from the frypot 520 to the filter pan 530*b* (or to drain the system) may be accomplished by gravity and without the use of a pump.

In some embodiments, one or more valves 140 (140*a*) may be provided that are disposed with respect to the pump 220 and the filter pan 530*b*. In some embodiments, a valve 140 may be positioned upstream of the pump 220, such that the valve 140 is connected at the input of the pump 220, while in other embodiments, the valve may be positioned such that it is connected to the discharge of the pump 220. In some embodiments, the valve 140*a* may be provided instead of valve 140, while in other embodiments, both the valves 140, 140*a* may be provided on opposite sides of the pump 220. In some embodiments, the valve 140 (140*a*) may be a valve with a single inlet and a single outlet.

The fryer 510 may have a control panel 515 that allows for user inputs to control the cooking functions of the fryer 510 as well as the settings, ranges and thresholds of the sensor 100. The control panel 515 may communicate with the control system 5110 (shown schematically in FIG. 5), to automatically or manually operate the fryer 510 and its associated plumbing system. As shown schematically in FIG. 5, the fryer 510 and specifically the filtration system 530 may be connected to a source of cooking liquid such as in a holding tank 540, which may be either pumped to the fryer 510 or allowed fluid drain to the fryer 510 using gravity.

The capacitive sensor 100, as described hereinbefore in relation to FIGS. 1, 2A-2E, and 3, may be disposed within the filtration system 530 in a position with the radiator (102, best shown in FIG. 1) at a level representative of the desired minimum oil level within the filter pan for safe and efficient operation. The sensor 100, via the sensor electronics 140 (described hereinbefore), provides the controller 142 with a capacitive value signal that is representative of the presence (air-to-oil condition) or absence (oil-to-air condition) of oil proximate to the sensor at the necessary level within the filter pan. The microcontroller 142 receives the capacitive value signal and based upon the signal received provides control signals to the fluid management system and associated plumbing.

In some embodiments, the sensor may be calibrated such that the sensed capacitance (and therefore the existence and level of fluid proximate to the sensor) is specifically based upon positioning of the sensor within the filter pan of the filtration system 530. That is, the sensed capacitive value may be a function of the position of the sensor with respect to, for example, a wall of the filter pan 530*b*. While the system may be calibrated based upon the specific position of the sensor within the filter pan, in relation to a structure of the filter pan, one of ordinary skill in the art should appreciate that calibration may be based on non-filtration system structures placed in proximity to the sensor and made a part of the circuit/system as described herein. Generally, sufficient space should exist between the sensor and the structure (e.g. wall) for an amount of fluid to be positioned between the sensor and structure for a reliable and repeatable capacitance level of fluid, e.g. cooking oil, to be achieved. In one aspect, the filter pan may contain or define a cavity within its walls suitable for placement of the sensor 100, such that the sensor may be recessed in the filter pan, yet still be surrounded by fluid.

As described, the microcontroller receives a signal from the sensor, via the sensor electronics 140, that is proportional to the capacitance of fluid present, which capacitance may be calibrated based on the type of fluid. Memory in association with the microcontroller (e.g. a look-up table) maintains capacitance information based upon type of fluid, e.g. appropriate ranges or "windows" of capacitive value, that are correlated to control signals to send to the fluid management system 144, to either drain fluid from the fry vat for filtering or return fluid from the filter pan to the fryer vat.

In some embodiments, the sensor and system may be calibrated to provide a signal that is understood by the controller that cooking oil surrounds the sensor when the sensor is fully covered by cooking oil (in some embodiments, specifically the radiator shell 102), i.e. cooking oil surrounds the entire circumferential side surface of the sensor. In some embodiments, the sensor and system may be calibrated to provide a signal that is understood by the controller that cooking oil surrounds the sensor when about 90% of the height, or in other embodiments 90% of the total circumferential area, of the sensor is surrounded by cooking oil. Other calibrations may be contemplated and are within the scope of the disclosure.

In some embodiments, the controller may be programmed to provide an error message to the user (by way of a message board, digital readout, warning light, audible signal, or the like when the measured capacitance does not fall within a value (or range of values) of calibrated capacitance of cooking oil (room temperature through hot), or air. In this case, it is possible that the sensor is not operating properly, or it is possible that the surfaces of the sensor or perhaps the surfaces of the walls that are proximate to the sensor (side wall or the like) are covered with foreign materials such that the measured capacitance differs from the normally calibrated capacitance. The error message may prompt the user to investigate the cause, and to take steps to cure the same, e.g. mechanically cleaning the surface of the sensor or the walls of the vat to try to clear the error message.

Although the illustrative control processing as described in embodiments herein is described as implemented by microcontroller program code, it should be appreciated by those skilled in the art that discrete control electronics, large scale integrated circuitry or other control technologies may be used to implement the functionality described herein. Similarly, although a coaxial probe is described using the inner conductor and outer conductive sheathing of a length of coaxial cable, and implemented using specific interconnections as described herein, it should be appreciated by those skilled in the art that the coaxial probe could be alternatively constructed, such as with independent conductors effecting the same specific interconnections as described. Further, although the capacitive sensor is described as having a geometrically-shaped, cylindrical shell or probe radiator, it should be appreciated that alternative constructions and geometries could be implemented within the scope of the disclosure.

While the fluid and placement detection systems above are depicted as used by a deep fryer, one of ordinary skill in the art will appreciate that other equipment may benefit from the system disclosed herein. Further, one of ordinary skill in the art would readily understand any appropriate modifications to the system disclosed herein for application with other equipment that could benefit from this system.

While various embodiments are disclosed herein, it should be understood that the invention is not so limited and modifications may be made without departing from the disclosure. The scope of the disclosure is defined by the appended claims, and all devices that come within the meaning of the claims, either literally or by equivalence, are intended to be embraced therein.

What is claimed is:

1. A fryer system, comprising:
a vat for holding fluid;
a filtration system including a filter pan for receipt and filtering of a volume of the fluid;
a capacitive sensor disposed within the filter pan of the filtration system such that the capacitive sensor is disposed to communicate with the volume of fluid within the filter pan, the capacitive sensor includes a radiator having a recess that receives a receptacle configured into electrically conductive engagement with the radiator, the receptacle configured to receive a stripped cable end of a coaxial cable having a center conductor, dielectric around the center conductor, and outer conductor, forming a coaxial electrode, the center conductor configured in electrical continuity with the radiator, and the capacitive sensor is disposed to communicate with the volume of fluid within the filter pan; and
a controller receiving a signal representing a capacitive value from the capacitive sensor, the signal indicating to the controller at least one of presence or absence of the filter pan and presence or absence of the fluid within the filter pan.

2. The fryer system of claim 1, wherein the capacitive sensor comprises a radiator structure at a first end and a jack at an end distal from the radiator structure, and a coaxial structure with an inner conductor electrically connected to the radiator structure and to a portion of the jack.

3. The fryer system of claim 2, wherein the radiator of the capacitive sensor comprises a geometric metallic shell, with a receptacle disposed within the shell for connecting the coaxial structure within the radiator.

4. The fryer system of claim 1, wherein the capacitive sensor is positioned proximate to an inner metallic wall or appended structure of the filtration system.

5. The fryer of claim 1 wherein the capacitive sensor is calibrated to detect presence of the fluid in the filter pan.

6. The fryer system of claim 1, further comprising a plumbing system establishing fluid communication between the vat and the filter pan, the plumbing system comprising one or more valves and at least one pump.

7. The fryer system of claim 6, wherein the operation of the one or more valves and the pump of the plumbing system establishes a flow of fluid between the filter pan and the vat.

8. The fryer system of claim 6, wherein operation of the one or more valves of the plumbing system establishes a first flow of fluid from the vat to the filtration system and a second flow of fluid from the filtration system to the vat.

9. The fryer system of claim 6, wherein the controller controls operation of the plumbing system based on the capacitive value, and wherein the controller operates one of the one or more valves of the plumbing system to operate an oil management process in response to a reading from the capacitive sensor.

* * * * *